United States Patent
Tariq et al.

(10) Patent No.: US 12,132,668 B2
(45) Date of Patent: *Oct. 29, 2024

(54) NETWORK-AWARE RESOURCE ALLOCATION

(71) Applicant: Hewlett Packard Enterprise Development LP, Spring, TX (US)

(72) Inventors: Ali Tariq, Palo Alto, CA (US); Lianjie Cao, Milpitas, CA (US); Faraz Ahmed, Milpitas, CA (US); Puneet Sharma, Palo Alto, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/311,430

(22) Filed: May 3, 2023

(65) Prior Publication Data

US 2023/0275848 A1 Aug. 31, 2023

Related U.S. Application Data

(63) Continuation of application No. 17/468,517, filed on Sep. 7, 2021, now Pat. No. 11,665,106.

(51) Int. Cl.
*H04L 47/78* (2022.01)
*H04L 43/0882* (2022.01)
(Continued)

(52) U.S. Cl.
CPC ........ *H04L 47/803* (2013.01); *H04L 43/0882* (2013.01); *H04L 43/16* (2013.01);
(Continued)

(58) Field of Classification Search
None
See application file for complete search history.

(56) References Cited

U.S. PATENT DOCUMENTS 8,966,030 B1 * 2/2015 Sirota ................ H04L 67/10
709/221
9,003,021 B2 4/2015 Wright et al.
(Continued)

FOREIGN PATENT DOCUMENTS

EP 3761172 A1 1/2021

OTHER PUBLICATIONS

Chen et al., "Elastic Parameter Server Load Distribution in Deep Learning Clusters", ACM, 2020, 15 pages.
(Continued)

*Primary Examiner* — Joshua Joo
(74) *Attorney, Agent, or Firm* — Hewlett Packard Enterprise Patent Department

(57) ABSTRACT

Systems and methods are provided for updating resource allocation in a distributed network. For example, the method may comprise allocating a plurality of resource containers in a distributed network in accordance with a first distributed resource configuration. Upon determining that a processing workload value exceeds a stabilization threshold of the distributed network, determining a resource efficiency value of the plurality of resource containers in the distributed network. When a resource efficiency value is greater than or equal to the threshold resource efficiency value, the method may generate a second distributed resource configuration that includes a resource upscaling process, or when the resource efficiency value is less than the threshold resource efficiency value, the method may generate the second distributed resource configuration that includes a resource outscaling process. The resource allocation may transmit the second to update the resource allocation.

26 Claims, 6 Drawing Sheets

(51) Int. Cl.
*H04L 43/16* (2022.01)
*H04L 47/70* (2022.01)
*H04L 47/762* (2022.01)
*H04L 47/80* (2022.01)

(52) U.S. Cl.
CPC .......... *H04L 47/762* (2013.01); *H04L 47/781* (2013.01); *H04L 47/822* (2013.01)

(56) References Cited

U.S. PATENT DOCUMENTS

| | | | |
|---|---|---|---|
| 10,776,236 B1 | 9/2020 | Kudrin et al. | |
| 10,963,438 B1 | 3/2021 | Dong et al. | |
| 11,016,799 B1 | 5/2021 | Kim | |
| 2008/0168301 A1 | 7/2008 | Chen | |
| 2013/0254384 A1* | 9/2013 | Wray | G06F 11/3409 709/224 |
| 2017/0060609 A1* | 3/2017 | Cropper | G06F 9/5077 |
| 2017/0199770 A1* | 7/2017 | Peteva | G06F 9/5088 |
| 2017/0302586 A1* | 10/2017 | Suchter | H04L 47/83 |
| 2018/0321993 A1* | 11/2018 | McClory | H04L 41/5041 |
| 2019/0095241 A1 | 3/2019 | Ago et al. | |
| 2019/0114705 A1 | 4/2019 | Wong et al. | |
| 2019/0166007 A1* | 5/2019 | Sundaram | H04L 43/045 |
| 2019/0306236 A1* | 10/2019 | Wiener | H04L 41/0897 |
| 2019/0312772 A1 | 10/2019 | Zhao et al. | |
| 2019/0324856 A1 | 10/2019 | Zhao et al. | |
| 2019/0370146 A1 | 12/2019 | Babu et al. | |
| 2020/0026564 A1 | 1/2020 | Bahramshahry et al. | |
| 2020/0042362 A1 | 2/2020 | Cui et al. | |
| 2020/0057558 A1* | 2/2020 | Beloussov | G06F 3/0634 |
| 2020/0159589 A1 | 5/2020 | Capes et al. | |
| 2020/0174840 A1 | 6/2020 | Zhao et al. | |
| 2020/0225991 A1* | 7/2020 | Bradshaw | G06F 9/505 |
| 2020/0241993 A1* | 7/2020 | Chen | G06F 11/3409 |
| 2020/0250525 A1 | 8/2020 | Kumar et al. | |
| 2020/0257512 A1 | 8/2020 | Iyengar Gorur Krishna | |
| 2020/0301782 A1 | 9/2020 | Radhakrishnan et al. | |
| 2020/0304297 A1 | 9/2020 | Radhakrishnan et al. | |
| 2020/0319988 A1* | 10/2020 | Baxter | G06F 11/3433 |
| 2020/0382380 A1* | 12/2020 | Sundaram | G06F 9/5044 |
| 2021/0026680 A1 | 1/2021 | Toy | |
| 2021/0247995 A1 | 8/2021 | Kim | |
| 2021/0349747 A1* | 11/2021 | Albasheir | G06F 11/302 |
| 2021/0357255 A1* | 11/2021 | Mahadik | G06F 11/3006 |
| 2021/0373971 A1* | 12/2021 | Lu | G06F 9/5088 |
| 2022/0156661 A1* | 5/2022 | Xu | H04L 41/0826 |
| 2022/0237090 A1* | 7/2022 | Ferreira | H04L 67/1095 |
| 2022/0334877 A1* | 10/2022 | Knierim | G06F 9/505 |
| 2022/0342866 A1* | 10/2022 | Kotwal | G06F 16/188 |
| 2023/0047781 A1* | 2/2023 | Narayanan | G06F 16/285 |
| 2023/0403198 A1* | 12/2023 | Cai | H04L 41/5025 |

OTHER PUBLICATIONS

Dhakal et al., "GSLICE: Controlled Spatial Sharing of GPUs for a Scalable Inference Platform", ACM, 2020, 15 pages.
Ghodsi et al., "Dominant Resource Fairness: Fair Allocation of Multiple Resource Types", USENIX Association, 2011, 14 pages.
Gu et al., "Tiresias: A GPU Cluster Manager for Distributed Deep Learning", 16th USENIX Symposium on Networked Systems Design and Implementation (NSDI '19), 2019, 17 pages.
Karypis et al., "A fast and high quality multilevel scheme for partitioning irregular graphs", Society for Industrial and Applied Mathematics, 1998, 34 pages.
Lee et al., "Automating System Configuration of Distributed Machine Learning", IEEE 39th International Conference on Distributed Computing Systems (ICDCS), 2019, 11 pages.
Peng w et al., "Optimus: An Efficient Dynamic Resource Scheduler for Deep Learning Clusters", ACM, 2018, 7 pages.
Xiao et al., "Gandiva: Introspective Cluster Scheduling for Deep Learning", 13th USENIX Symposium on Operating Systems Design and Implementation, 2018, 17 pages.
Zhang et al., "SLAQ: Quality-Driven Scheduling for Distributed Machine Learning", Proceedings of the 2017 Symposium on Cloud Computing, 2017, 15 pages.

* cited by examiner

NETWORK-AWARE RESOURCE ALLOCATION

CROSS-REFERENCE TO RELATED APPLICATIONS

This application is a continuation application of and claims priority to application Ser. No. 17/468,517, filed on Sep. 7, 2021, the contents of which are hereby incorporated by reference in their entireties.

BACKGROUND

Remote systems can be temporarily reserved for data processing tasks. When reserving the processing power remotely, a request can specify how much of each resource a container consumes (e.g., containers decouple software applications from the underlying host infrastructure). The most common resources to specify are the central processing unit (CPU) and memory (e.g., RAM).

When generating the resource request for the container, the scheduler in the remote system uses this information to decide which computing node to use to process the task. The remote system may also limit the resources that are reserved for running the tasks on containers and enforce those limits so that the running container is not allowed to use more of that resource than the limit set. The remote system also reserves at least the requested amount of that system resource specifically for that container to use.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
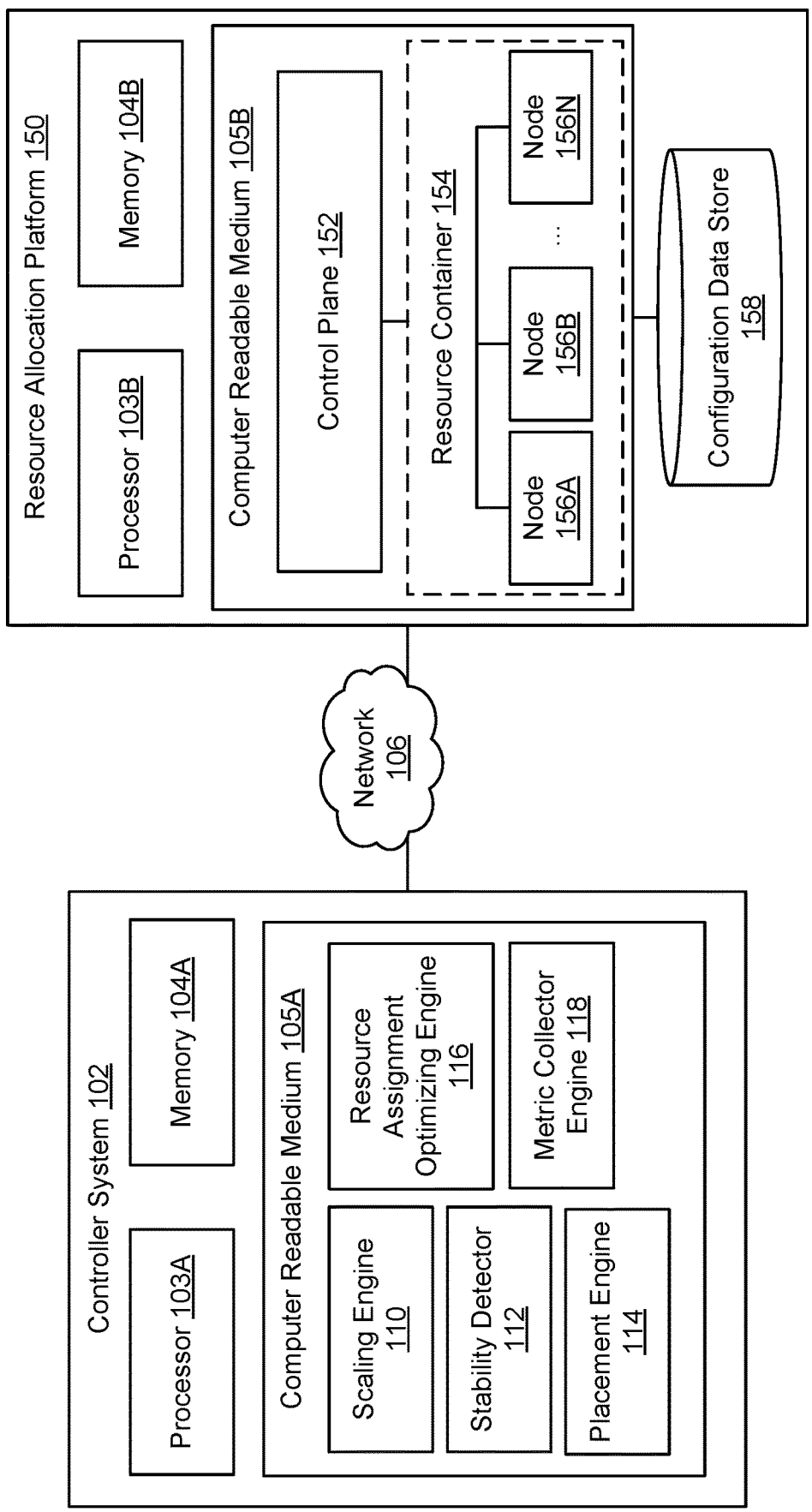
FIG. 1 illustrates a controller system and container platform, in accordance with some embodiments of the disclosure.

The figures are not exhaustive and do not limit the present disclosure to the precise form disclosed.

DETAILED DESCRIPTION

Traditional systems allow users to remotely deploy data processing tasks. For example, using Tensorflow® with Kubeflow® on top of Kubernetes®, the user can deploy machine learning (ML) training code or other resource intensive software executable using multiple containers as parameter server (PS) or worker (WK) nodes and share the infrastructure with other users. The parameter server distribution strategy may divide the data processing task and execute the task on multiple worker nodes. The results may be transmitted from the worker nodes back to the parameter server nodes for aggregation. In each training iteration, worker nodes compute parameter updates (i.e., gradients) using their local data partition, and push gradients to one or more parameter server nodes that maintain the respective model parameters. Each parameter server node applies received gradients to its stored parameters after which the workers pull updated parameters from the parameter server nodes for the next training iteration.

In this traditional system, the user would specify infrastructure-level resource configurations such as how many parameter server and worker nodes, as containers, would be started, how to allocate resources (e.g., virtual central processing unit (vCPU), graphics processing unit (GPU), memory, etc.) among these containers, and how to place the containers on the physical servers in the remote computing environment. Different resource configurations may affect the processing speed and completion time of the data processing tasks due to various performance bottlenecks including parallelism limit, parameter server network bottleneck, and imbalanced resource usage. Additionally, network issues may arise to affect the remote processing of these tasks so that no matter the amount of resources that are reserved to run the data processing task, the system may not run at its full potential.

In some contexts, like machine learning, performance of a data processing job (e.g., processing speed, an amount of time or resources to train a machine learning model, etc.) is almost linearly related to the allocated compute resources (e.g., CPU, GPU, etc.). However, due to the parallelism limit of the machine learning framework (e.g., a maximum amount of simultaneous or parallel processing tasks, etc.), one compute node may effectively use the allocated resources up to a certain value. The actual parallelism limit may vary depending on the configuration of substrate servers and data processing task (e.g., the ML training job). As such, the resource configuration of a distributed data processing task may help determine how to efficiently utilize and improve the data processing (e.g., number and resource allocation of parameter server nodes and worker nodes, the resource budget, etc.).

Embodiments of the application improve systems and methods for implementing remote processing tasks in a container format or by using virtual machines (VMs). Either of these embodiments may be implemented without diverting from the scope of the disclosure. For example, the system can automatically and adaptively allocate resources to data processing tasks for achieving shorter job completion time and better resource efficiency. The system can monitor various resource utilization values (e.g., compute and network) to identify different performance bottlenecks of the data processing task and overcome those bottlenecks by making appropriate scaling decisions.

The system can gradually scale up an allocation of compute nodes or other resources if the current configuration can efficiently utilize the allocated resources. If the resource efficiency is lower than a threshold value (e.g., less than 50%, less than 70%, etc.), the system can assume that the data processing task is suffering from either a parallelism performance bottleneck or a parameter server node network bottleneck. To alleviate the bottleneck, the system may implement an outscaling process by adding more parameter server or worker nodes based on the compute and network usage information. To further alleviate parameter server network bottlenecks, the system can determine the mapping of parameter server and worker nodes (e.g., using a distributed resource configuration) to physical servers to minimize the external network traffic among cluster nodes. During the runtime of the data processing job, the system may monitor compute resource utilization of each compute node and make online dynamic adjustments of the resource assignments for each compute node to ensure high resource efficiency and data processing performance.

In some examples, the system may analyze the overall compute resource efficiency to decide whether to add more resources to a data processing task (e.g., resource upscaling process) or modify the distributed training configuration (e.g., resource outscaling process). The outscaling process may be implemented using multiple iterations of a distributed resource configuration. The distributed resource configuration may comprise one or more software applications or configuration settings (e.g., using a DT-config to define a number of parameter server and worker nodes, etc.) and/or a set of rules or definitions of resource allocation (e.g., a resource allocation to each parameter server and worker nodes, etc.). When generating the distributed resource configuration, the system may analyze the network utilization to identify whether the bottleneck is parameter server nodes or worker nodes and create a new node of the corresponding component. With a new distributed resource configuration, the placement engine decides how to place parameter server nodes or worker nodes on physical servers to minimize the network traffic across physical servers.

The distributed resource configuration may replace static resource assignment of compute nodes. The static configurations may lead to inefficient resource utilization and low training performance, whereas replacing the distributed resource configuration in response to determining updated processing information can schedule processing tasks dynamically and improve resource utilization.

One illustrative example is training a machine learning (ML) model (however, any data or processing task may be implemented for this optimized system). For example, training ML models is resource-intensive and time-consuming. Systems can divide, distribute, and execute a ML training job on multiple worker nodes and the results are synchronized and aggregated by parameter server nodes. The parameter server node may be implemented on a greater hierarchy level than the worker node. Each compute node (e.g., worker node and parameter server, etc.) can be a bare metal machine, a virtual machine, or a container. For this layout, a parameter server based ML training job, worker nodes may periodically communicate with parameter server nodes for exchanging the latest model updates. As an illustrative example, network traffic of an ML training job for Visual Geometry Group from Oxford (VGG16) convolutional neural network (CNN) or other ML model architecture with one parameter server and two worker nodes can reach up to 4.2 Gbit/second. If not addressed appropriately, insufficient network bandwidth can have a significant negative impact on the training performance.

By incorporating a resource allocation platform, a training job can be distributed onto multiple compute nodes to take advantage of parallel computing. The parameter server framework can split and execute training data and workload on a set of parameter server nodes and worker nodes. By incorporating container technology with the resource allocation, the system can run the parameter server nodes and worker nodes as containers and flexibly allocate resources (e.g., CPU, memory) to each node.

Technical improvements are realized throughout the disclosure. For example, by determining the network issue for the slow processing speeds, the system can dynamically optimize resource assignments among at least some of the compute nodes to ensure high resource efficiency. This correction may be performed during runtime to continually improve processing speeds and reduce system bottlenecks.

FIG. 1 illustrates a controller system and container platform, in accordance with some embodiments of the disclosure. The system may comprise controller system 102 in communication with resource allocation platform 150 via network 106. Both comprise controller system 102 and resource allocation platform 150 may comprise one or more processors 103 (illustrated as processor 103A and 103B), memory 104 (illustrated as memory 104A and 104B), and computer readable medium 105 (illustrated as processor 105A and 105B). Computer readable medium 105 may comprise one or more engines or control planes, as discussed herein.

Processor 103 may be one or more central processing units (CPUs), semiconductor-based microprocessors, and/or other hardware devices suitable for retrieval and execution of instructions stored in computer readable medium 105. Processor 103 may fetch, decode, and execute instructions to control processes or operations for optimizing the system during run-time. As an alternative or in addition to retrieving and executing instructions, processor 103 may include one or more electronic circuits that include electronic components for performing the functionality of one or more instructions, such as a field programmable gate array (FPGA), application specific integrated circuit (ASIC), or other electronic circuits.

Memory 104 may comprise a random access memory (RAM), cache, and/or other dynamic storage devices, coupled to a bus for storing information and instructions to be executed by processor 103. Memory 104 also may be used for storing temporary variables or other intermediate information during execution of instructions to be executed by processor 103. Such instructions, when stored in storage media accessible to processor 103, render computer system (e.g., controller system 102, resource allocation platform 150) into a special-purpose machine that is customized to perform the operations specified in the instructions.

Computer readable medium 105 may be any electronic, magnetic, optical, or other physical storage device that contains or stores executable instructions. Thus, computer readable medium 105 may be, for example, Random Access Memory (RAM), non-volatile RAM (NVRAM), an Electrically Erasable Programmable Read-Only Memory (EEPROM), a storage device, an optical disc, and the like. As described in detail below, computer readable medium 105 may be encoded with executable instructions.

Controller system 102 may implement one or more engines within computer readable medium 105, including scaling engine 110, stability detector 112, placement engine 114, resource assignment optimization engine 116, and metric collector engine 118.

Controller system 102 may utilize the resources of resource allocation platform 150. For example, controller system 102 may transmit a distributed resource configuration to resource allocation platform 150 and resource allocation platform 150 can allocate the resources (e.g., CPU, GPU, memory, etc.) for controller system 102 to use to process a training job, processing task, and the like.

The distributed resource configuration may comprise a distributed training configuration (e.g., "DT-config<$n_{ps}$, $n_{wk}$>") and the resource allocation (<$r_{ps}$, $r_{wk}$>) of the distributed resource configuration. Here, $n_{ps}$ and $n_{wk}$ denote the number of parameter server nodes and the number of worker nodes respectively, and $r_{ps}$ and $r_{wk}$ denote the amount of compute resources allocated to parameter server nodes and worker nodes, respectively.

Scaling engine 110 may be configured to aggregate the compute resource usage values of at least some of the compute nodes and calculate the current overall compute resource efficiency for a particular data processing task. Based on the performance issues identified in the system (e.g., performance bottleneck, low resource efficiency, etc.), scaling engine 110 can adjust the configuration of the resources, for example, by a configurable scale-up ratio (e.g., by updating the distributed resource configuration) through the upscaling process and the outscaling process. The upscaling process and the outscaling process may be determined once the data processing tasks are stabilized (as determined by stability detector 112).

As an illustrative example, let $u_i$ denote the resource usage of a compute node $i \in \{1, 2, \ldots, n_{ps}+n_{wk}\}$ and let $a_i$ denote the resource assignment of node i, then the resource efficiency is defined as $e_{job}=\Sigma_i u_i/\Sigma_i a_i$. If $e_{job} \geq E_{thd\_job}$ (e.g., $E_{thd\_job}=0.7$ by default). The distributed resource configuration may not be experiencing any performance bottleneck and at least some of the allocated resources may be efficiently used by the data processing job. In this case, the resource allocation can be increased by a configurable scale-up ratio $R_{up}$ ($R_{up}=50\%$ by default) that controls how aggressive the resource scaling up behaves.

Stability detector 112 may be configured to compare a processing workload value to a stabilization threshold of the distributed network. In some examples, the stabilization threshold is a value corresponding with the processing workload of compute resource usage and training speed for a predetermined interval of time. In some examples, the stabilization threshold comprises telemetry information including compute utilization or network utilization associated with the processing of the resource usage data.

The resource usage data may vary by implementation. For example, the data may comprise a processing speed of a data processing task, an amount of time or resources to train a machine learning model, a data throughput or utilization value at a processor, or other information.

The stabilization threshold can help determine whether the processing workload value exceeds an acceptable value. The processing workload value receive telemetry information from the metric collector and then compute the coefficient-of-variance (CV) of the most recent $N_{compute}$ five samples. If the CV is less than five percent, the processing workload value of the current job may be stabilized. Stability detector 112 can send a signal to the scaling engine and resource optimization engine. Those two components can start to compare various resource usage data (e.g., the resource efficiency, etc.) and make corresponding decisions such as upscaling, outscaling, and resource redistribution.

Stability detector 112 may also be configured to provide resource usage data to resource allocation platform 150. Resource allocation platform 150 initiates processing of the resource usage data in accordance with the first distributed resource configuration and a processing workload value.

In some examples, the resource usage data is associated with a machine learning (ML) model. For example, the resource usage data is training data for the ML model and requires a significant amount of processing power in order to train the ML model.

Stability detector 112 may also be configured to, upon determining that the processing workload value exceeds the stabilization threshold of the distributed network, determine a resource efficiency value of the plurality of resource containers in the distributed network.

Stability detector 112 may also be configured to detect whether the current job is stabilized. If yes, stability detector 112 may generate and send a signal to the resource optimization engine.

Placement engine 114 may determine one or more compute nodes in a given distributed resource configuration that are scheduled and launched as containers 156 on the cluster nodes. The compute nodes may be determined based on the network traffic between parameter server nodes and worker nodes, where there is no "parameter server to parameter server" or "worker node to worker node" network communication. The data processing task placement may be identified to reduce the network traffic across cluster nodes. This may reduce the occurrence of parameter server network bottleneck.

Figure 2:
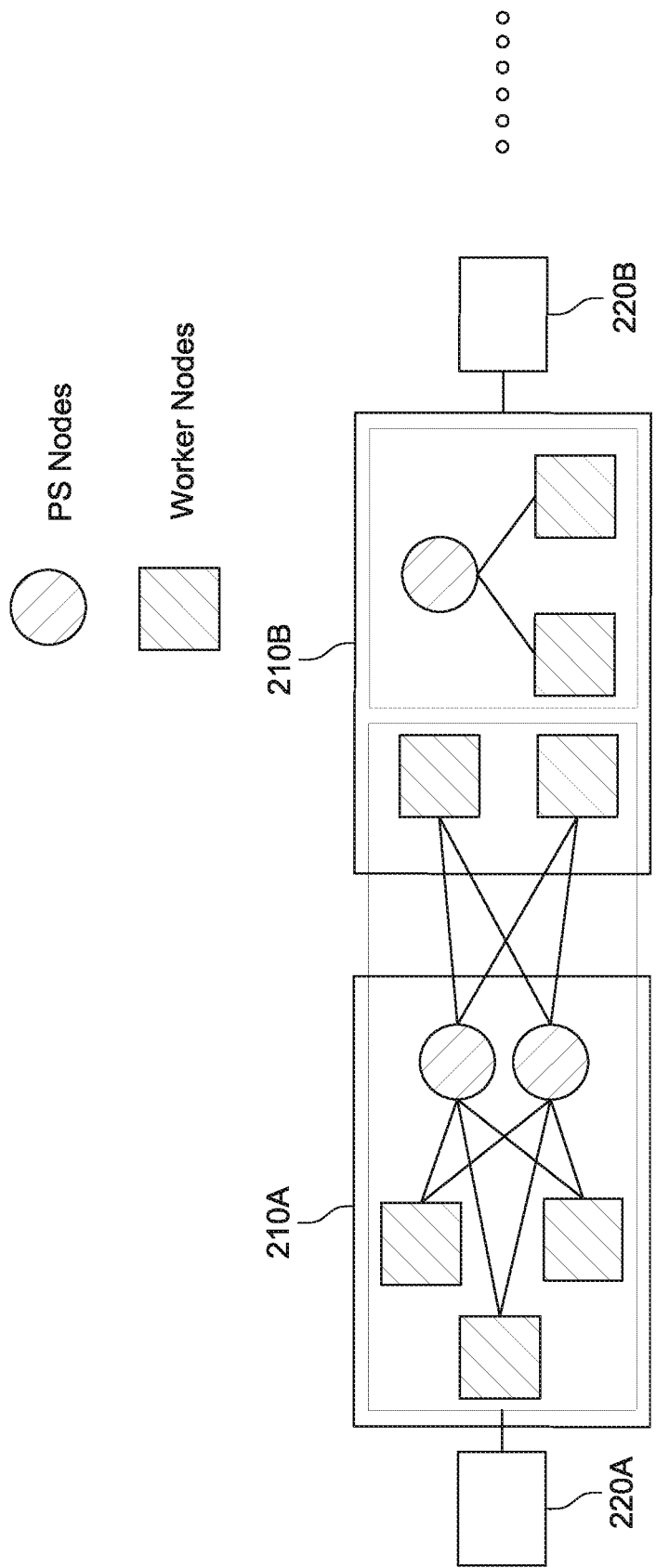
FIG. 2 illustrates container nodes implementing two processing jobs, in accordance with some embodiments of the disclosure.

Parameter server nodes and worker nodes are illustrated in FIG. 2. For example, cluster nodes 210 (illustrated as first cluster node 210A and second cluster node 210B) are a group of computing resources that may implement data processing tasks. In this example, cluster nodes 210 implement two processing jobs 220 using parameter server nodes and worker nodes. First job 220A comprises two parameter server nodes and five worker nodes over two cluster nodes 210 and second job 220B comprises one parameter server node and two worker nodes over one cluster node 210 The plurality of resource containers in the distributed network may be limited to a maximum resource value that is predetermined (e.g., based on a payment or credit provided by a user, etc.).

In some examples, placement engine 114 may generate a weighted graph to determine the placement of the compute node using a graph partitioning tool. The distributed resource configuration may be converted to the weighted graph with parameter server nodes and worker nodes as vertices and parameter server-to-worker node links as edges. The resource assignments may be compute nodes that are used as vertex weights. The weighted graph may be partitioned along with the current resource usage of the cluster nodes to generate subgraphs. Placement engine 114 may minimize the edge cut in the subgraphs and match the total weights of subgraphs (i.e., sum of vertex weights in the same subgraph) with available resources on cluster nodes. Vertices in the same subgraph may represent compute nodes and may be placed on the same cluster node. By minimizing the edge cut, the external network traffic across cluster nodes may also be minimized.

Resource assignment optimization engine 116 may be configured to generate one or more distributed resource configurations. The distributed resource configuration may comprise a number of parameter servers, a number of worker nodes, and a value associated with the resource budget (e.g., the resource budget is a maximum number of resources that can be used for the processing job, including a number compute nodes, processing power permitted to be used for the job, etc.). A default value for the resource budget may correspond with at least some of the available resources in a compute cluster for the data processing task.

In some examples, the first distributed resource configuration identifies the plurality of resource containers in the distributed network as comprising a first number of parameter server nodes and a first number of worker nodes. In some examples, the second distributed resource configuration changes the plurality of resource containers to include a second number of parameter server nodes or a second number of worker nodes.

As an illustrative example, the user may specify the resource budget $R_{max}$ (e.g., maximum number of CPUs that can be used) when a ML training job is submitted. A first distributed resource configuration may correspond with a new ML training job that defines a small proportion of the resource budget (e.g., $0.2 \cdot R_{max}$) and a simple distributed resource configuration $<n_{ps}, n_{wk}>$ with uniform resource allocation (e.g., the amount of compute resources allocated to a single parameter server or worker node is computed as $$\frac{0.2 \cdot R_{max}}{n_{ps} + n_{wk}}).$$

The system may determine if there is an issue with the distributed network and generate a second distributed resource configuration that changes some of these values.

Resource assignment optimization engine 116 may also be configured to provide a first distributed resource configuration to a resource allocation platform of a distributed network. The resource allocation platform may allocate a plurality of resource containers in the distributed network in accordance with the one or more distributed resource configurations.

Resource assignment optimization engine 116 may also be configured to, when the resource efficiency value is greater than or equal to the threshold resource efficiency value, generate a second distributed resource configuration that includes a resource upscaling process. The resource upscaling process may comprise adding more resources (e.g., 50% by default) to existing compute nodes. Additional detail about the resource upscaling process is provided with FIG. 3.

Resource assignment optimization engine 116 may also be configured to, when the resource efficiency value is less than the threshold resource efficiency value, generate the second distributed resource configuration that includes a resource outscaling process. The resource outscaling process may vary based on the type of issue. The issues may comprise adding one or more parameter server nodes to alleviate a network bandwidth issue, or adding one or more worker nodes to alleviate a parallelism performance bottleneck or other parallelism issue. Additional detail about the resource outscaling process is provided with FIG. 3.

Resource assignment optimization engine 116 may also be configured to transmit the second distributed resource configuration to the resource allocation platform 150 (e.g., via network 106). Resource allocation platform 150 may update the allocation of the plurality of resource containers 156 in the distributed network in accordance with the second distributed resource configuration.

Metric collector engine 118 may be configured to determine a processing workload value. In some examples, metric collector engine 118 collects key telemetry information including compute and network utilization, and ML training statistics (e.g., model accuracy, loss value, and training speed) until the entire job finishes.

There are several comparisons against threshold values in controller system 102. For example, the stability detector can check the coefficient variance (CV) of the most recent five samples and compare with five percent. In another example, the scaling engine can compare the job resource efficiency with the $E_{job\_thd}$ to make upscaling or outscaling decisions. In another example, the resource optimization engine can compares $E_{node\_thd}$ to decide if the resources can be redistributed.

Resource allocation platform 150 may implement one or more control planes within computer readable medium 105, including control plane 152 in communication with a plurality of resource containers 156 in a distributed network 154.

Control plane 152 may store one or more distributed resource configurations in configuration data store 156.

The compute nodes may communicate with each other via in distributed network 154, which is different than network 106. For example, controller system 102 may transmit and receive electronic communications from resource allocation platform 150.

Figure 3:
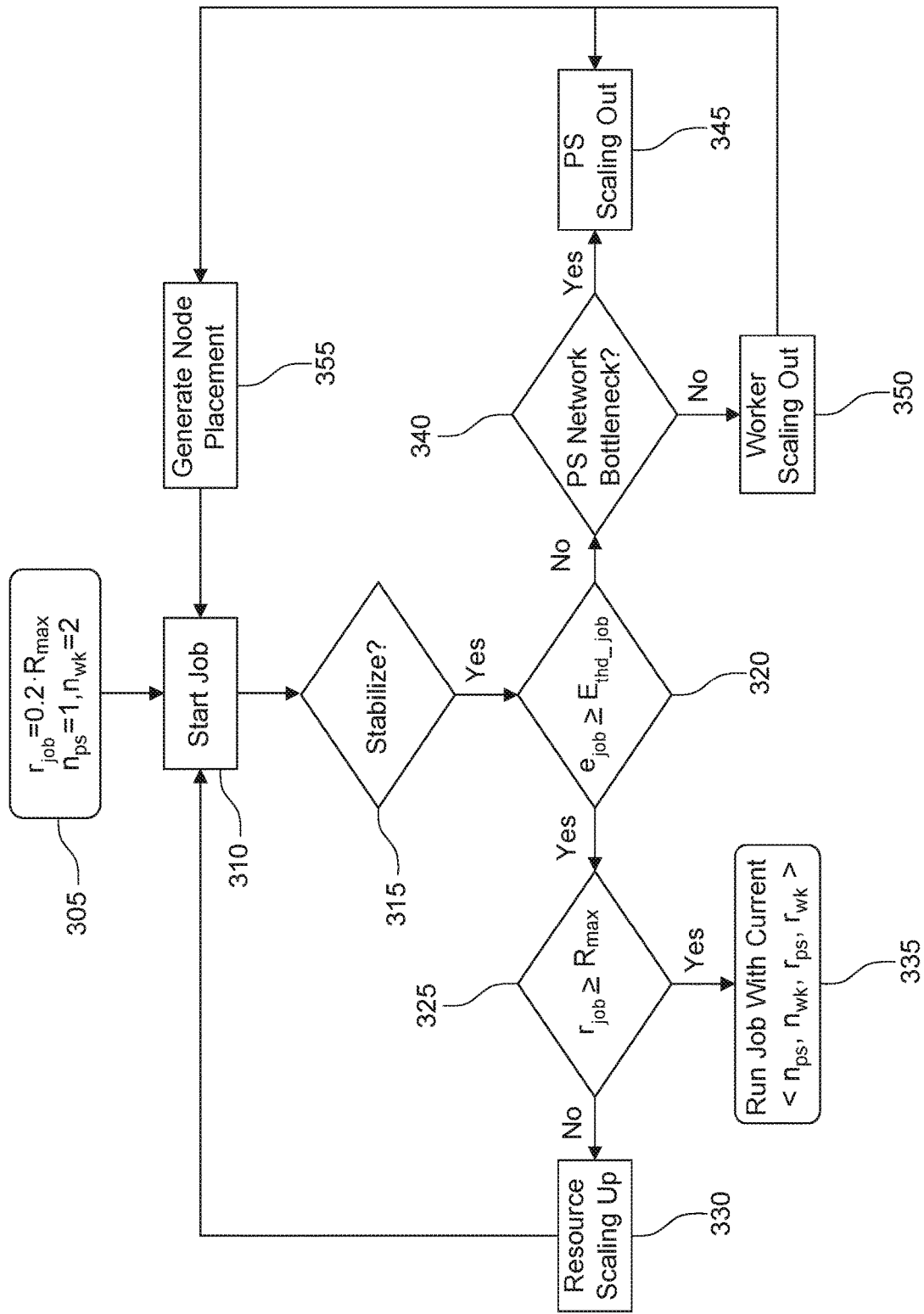
FIG. 3 provides a process for allocating resources based on network limitations, in accordance with some embodiments of the disclosure.

FIG. 3 provides a process for allocating resources based on network limitations, in accordance with some embodiments of the disclosure.

At block 305, a distributed resource configuration is provided from controller system 102 to resource allocation platform 150. The distributed resource configuration allocates a new data processing task with parameter server node resources and worker node resources equaling 20% of the given resource budget (i.e., $r_{job}=r_{ps}+r_{wk}=0.2 \cdot R_{max}$). In this example, the 20% value may be the default value configurable based on a user's preference.

At block 310, resource allocation platform 150 may start the data processing task if the total amount of available resources in the cluster is less $0.2 \cdot R_{max}$ (as defined by first distributed resource configuration). The new job may be started with at least some of the available resources. The initial resource allocation may be uniformly assigned to at least some of the compute nodes in accordance with the first distributed resource configuration (e.g., one parameter server node and two worker nodes).

As the task is running at resource allocation platform 150, controller system 102 (e.g., metric collector engine 118) may receive metric data about the network functions and other details while the data processing task is running with the current resource allocation. The metric data may comprise key telemetry information including compute and network utilization. When the data processing task includes training a machine learning model, the metric data may comprise ML training statistics (e.g., model accuracy, loss value, and training speed) until the training job stabilizes (e.g., stability detector 112).

At block 315, controller system 102 may determine if resource allocation platform 150 is stabilizing in the processing of the data processing task using the resource allocated in the first distributed resource configuration. For example, the stability threshold may correspond with a stability detection component that uses a strict coefficient-of-variance (CV<5%) for $N_{compute}=5$ consecutive measurement samples to decide whether the data processing job is stabilized for two major metrics: compute resource usage and training speed.

If resource allocation platform 150 is not stabilizing, the process may delay the determination of whether the resource allocation is efficient and/or wait for further instruction. This may be a predetermine time interval until another communication is transmitted from controller system 102 to resource allocation platform 150 to determine the current processing metrics.

At block 320, the data processing may be stabilized and controller system 102 (e.g., scaling engine 110) may determine computing efficiency of resource allocation platform 150.

At block 325, the computing efficiency may be used to determine if there is a parameter server bottleneck or parallelism limit. For example, controller system 102 may aggregate the compute resource usage of at least some of the compute nodes and calculate the current overall compute resource efficiency of the data processing job. As an illustration, let $u_i$ denote the resource usage of a compute node $i \in \{1, 2, \ldots, n_{ps}+n_{wk}\}$ and let $a_i$ denote the resource assignment of node i. Then, the resource efficiency is defined as $$e_{job} = \frac{\sum_i u_i}{\sum_i a_i}.$$

If $e_{job} \geq E_{thd\_job}$ ($E_{thd\_job}$=0.7 by default), the first distributed resource configuration and the corresponding resource allocation may be considered to not be experiencing any performance bottleneck and at least some of the allocated resources are efficiently used by the data processing job.

At block 330, controller system 102 can initiate a resource upscale process. For example, controller system 102 can generate a second distributed resource configuration that identifies the increase resource allocation by a configurable scale-up ratio $R_{up}$ ($R_{up}$=50% by default), which can control how aggressive the resource scaling up behaves.

At block 335, the available resources of the cluster is less than the requested amount. Controller system 102 may update the second distributed resource configuration with the available resources.

For example, as a starting point, the allocated resources may be equally allocated among at least some of the compute nodes, which may correspond with each parameter server node and worker node having the same resource assignment. However, the resource assignment of each compute node may be dynamically adjusted by the second distributed resource configuration that identifies changes to the allocation based on the runtime status. Hence, the resources introduced by the resource upscale process may be proportionally added to each compute node based on the previous resource assignments.

This left portion of the flowchart illustrated in FIG. 3 may correspond with the resource upscaling process, whereas the right portion of the flowchart illustrated in FIG. 3 may correspond with the resource outscaling process. For example, back to block 320, the resource efficiency may be less than the default value and the resource allocation may be considered to be experiencing a performance bottleneck.

At block 340, controller system 102 can determine whether there is a performance bottleneck at a parameter server node or at a worker node. The performance bottleneck may be identified, for example, when the performance of the data processing job may stop increasing linearly with a resource upscaling process. For example, if the compute resources allocated to a compute node exceeds the parallelism limit, the data processing is unable to efficiently use the extra resources. This can hinder the acceleration of job completion time and training speed. This may also inefficiently use resources that potentially can be allocated to other active data processing jobs.

Controller system 102 can detect the occurrence of performance bottlenecks of the data processing job when the overall compute resource efficiency is not good enough (e.g., $E_{job}$<0.7 or other default value) and address the performance bottlenecks by initiating a resource outscaling process of the first distributed resource configuration. The outscaling process may be designed to handle the parallelism limit and parameter server node bottleneck by adding worker nodes and/or parameter server nodes, respectively.

First, controller system 102 can determine whether there is a performance bottleneck at the parameter server node by polling $N_{net}$ ($N_{net}$=30 by default) network utilization samples of each parameter server node. These nodes may be the most recent scaling decision from the monitoring component. If more than 10% of those samples of a parameter server node are greater than 90% of the cluster network capacity (e.g., 0.9×10 Gbps), controller system 102 may determine that parameter server node is suffering from network bottleneck. A new parameter server node may be scaled out as part of an resource outscaling process at block 345. The new parameter server node may help balance the parameter server workload and network traffic in order to remove the network bottleneck.

If network bottleneck is not detected on any parameter server node, controller system 102 may determine that the low resource efficiency is caused by a parallelism limit of the worker nodes. In a parallelism limit, the worker nodes may be allocated with more resources than they can efficiently utilize. To address this bottleneck, controller system 102 may initiate a resource outscaling process for a new worker node at block 350.

For either block 345 or block 350, the current resource allocation to the parameter server nodes or worker nodes may be evenly redistributed. For example, $$\frac{r_{ps}}{n_{ps}} \text{ and } \frac{r_{wk}}{n_{wk}}$$

for each parameter server node and worker node, so each parameter server node and worker node is allocated with fewer resources. In some examples, resource allocation platform 150 may implement an additional resource adjustment component to further optimize the resource assignment for each compute node at runtime.

At block 355, compute node placement may be implemented. For example, compute nodes in a given distributed resource configuration may be scheduled and launched as containers on the cluster nodes. Most traditional container schedulers may place containers solely based on the current usage of cluster nodes because they have no knowledge of the workload. Comparatively, controller system 102 may use the network traffic information to further optimize the data processing placement in order to reduce the network traffic across cluster nodes. By doing this, controller system 102 can reduce the occurrence of parameter server node bottleneck.

In some examples, the compute node placement may be determined as a graph partitioning problem. A distributed resource configuration may be converted to a weighted graph. The parameter server node and worker nodes may be vertices and parameter server node to worker node links may be edges. The resource assignments of compute nodes ay be used as vertex weights.

Controller system 102 may partition the graph representation of the distributed resource configuration along with the current resource usage of the cluster nodes to generate subgraphs. Controller system 102 may generate subgraphs while minimizing the edge cut and matching the total weights of subgraphs (i.e., sum of vertex weights in the same subgraph) with available resources on cluster nodes. Vertices in the same subgraph can represent that compute nodes should be placed on the same cluster node. Minimizing the edge cut may be equivalent to the goal of minimizing the external network traffic across cluster nodes.

In some examples, controller system 102 may use an existing graphing system to generate the subgraphs (e.g., METIS, etc.). For example, the graphing system may generate the subgraphs using input from controller system 102. The graphing system may comprise a set of serial programs for partitioning graphs, partitioning finite element meshes, and/or producing fill reducing orderings for sparse matrices. The algorithms implemented in the graphing system may be based on multilevel recursive-bisection, multilevel k-way, and multi-constraint partitioning schemes.

Figure 4:
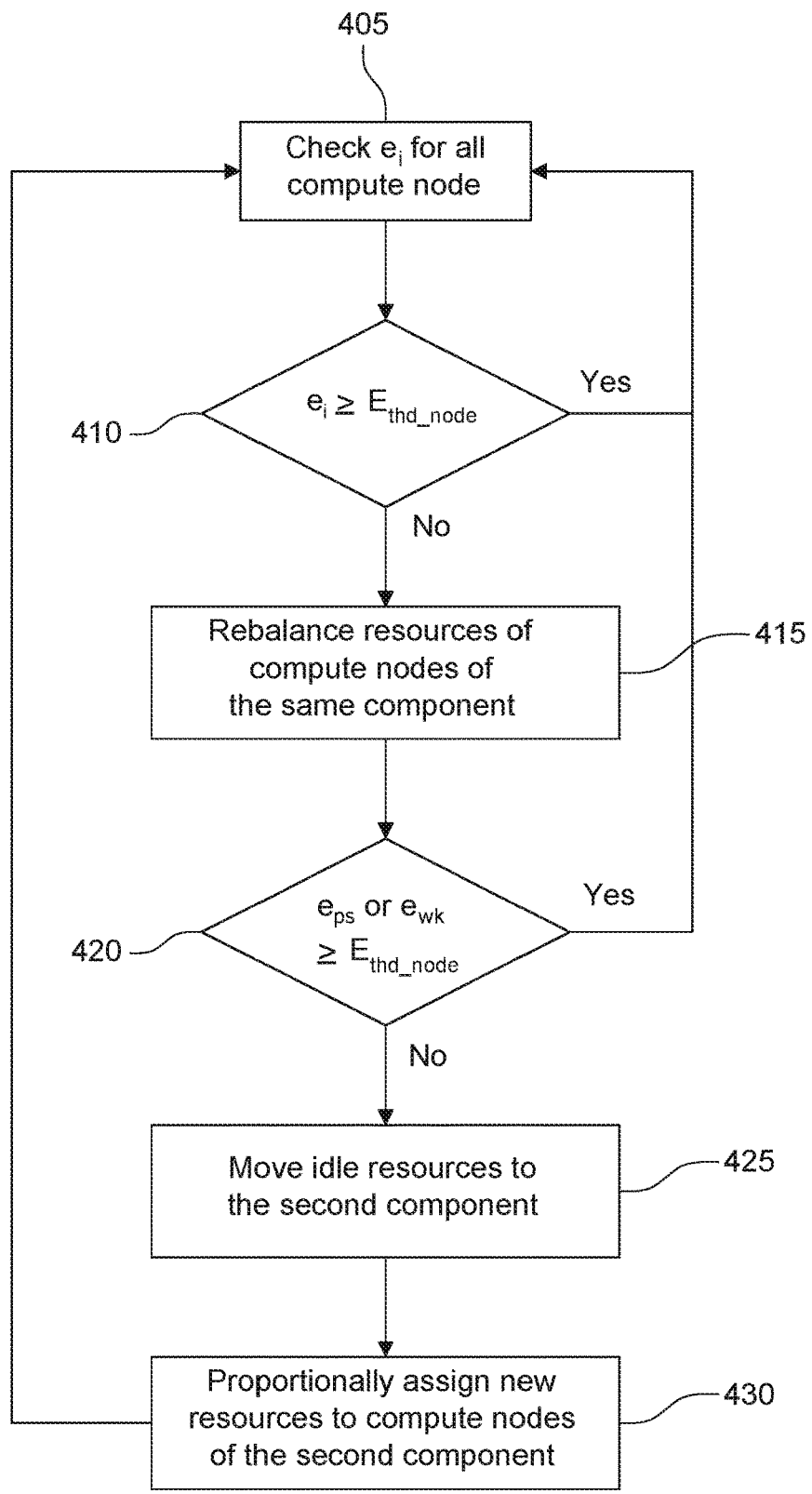
FIG. 4 provides a process for allocating resources based on network limitations, in accordance with some embodiments of the disclosure.

FIG. 4 provides a process for allocating resources based on network limitations, in accordance with some embodiments of the disclosure. In this illustration, a workflow of the resource assignment optimizer. With a given distributed resource configuration and compute node resource assignment and placement, the data processing job may be started or restarted as containers on the substrate cluster nodes. However, some resource allocation platforms that implement machine learning (ML) framework (e.g., TensorFlow®) can adopt dynamic task scheduling on worker nodes at runtime and the parameter server node workload may not be evenly distributed due to various tensor sizes of the ML model. Hence, the resource requirement of each compute node can be unique and may vary for different distributed resource configurations. The resource assignment adjustment component can run as a daemon module throughout the ML training job to optimize a per compute node resource assignment in an online fashion. A resource assignment optimizer may implement the process illustrated in FIG. 4.

The resource assignment adjustment can be implemented on two levels, including a node level and a component level (parameter server and worker). The parameter server nodes and worker nodes may be analyzed separately because parameter server and worker nodes can run on distinct computing tasks and show different resource usage patterns.

At block 405, the process may start at a node-level adjustment. Controller system 102 may poll the resource usage of at least some of the compute nodes at resource allocation platform 150 periodically after the training job stabilizes. Controller system 102 may calculate the resource efficiency of each node i as $e_i = u_i / a_i$.

At block 410, compare $e_i$ with a threshold value. If resource efficiency of node i is less than the predefined threshold $E_{thd\_node}$ (e.g., $E_{thd\_node}$=80% by default), a node-level adjustment process may be triggered at block 415.

At block 415, the node-level adjustment process may be executed. The goal of node-level adjustment may be to balance the resource efficiency of at least some of the compute nodes of the same component. As such, the node-level adjustment process may reclaim idle resources from nodes with lower resource efficiency and redistribute the resources to other nodes proportionally.

At block 420, the resource efficiency of the component may be computed. For example, after the node-level adjustment, controller system 102 may compute the resource efficiency of the component, $e_{ps}$ or $e_{wk}$, to check if a component-level adjustment process should be executed.

At block 425, idle resources may be moved to a second component. For example, if the resource efficiency of the current component is still less than $E_{thd\_node}$, it means the current component cannot efficiently utilize the allocated resources while the second component may be able to utilize those extra resources more efficiently and improve the training performance.

At block 430, new resources may be proportionally assigned to compute nodes of the second component. The same process may be repeated (e.g., return to block 405). The resource efficiency of the second component may be determined to check if the allocated resources are efficiently used by comparing it to $E_{thd\_node}$. If it is greater than $E_{thd\_node}$, controller system 102 may consider the second component is more likely to better utilize the extra resources. The extra resources may be moved from the first component and proportionally assigned to at least some of the compute nodes in the second component. If the resource efficiency of the second component is also less than $E_{thd\_node}$, it means both parameter server and worker components are not able to utilize the allocated resources. Controller system 102 may wait for the scaling decision engine to handle it by making resource outscaling process decisions.

It should be noted that the terms "optimize," "optimal," and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Figure 5:
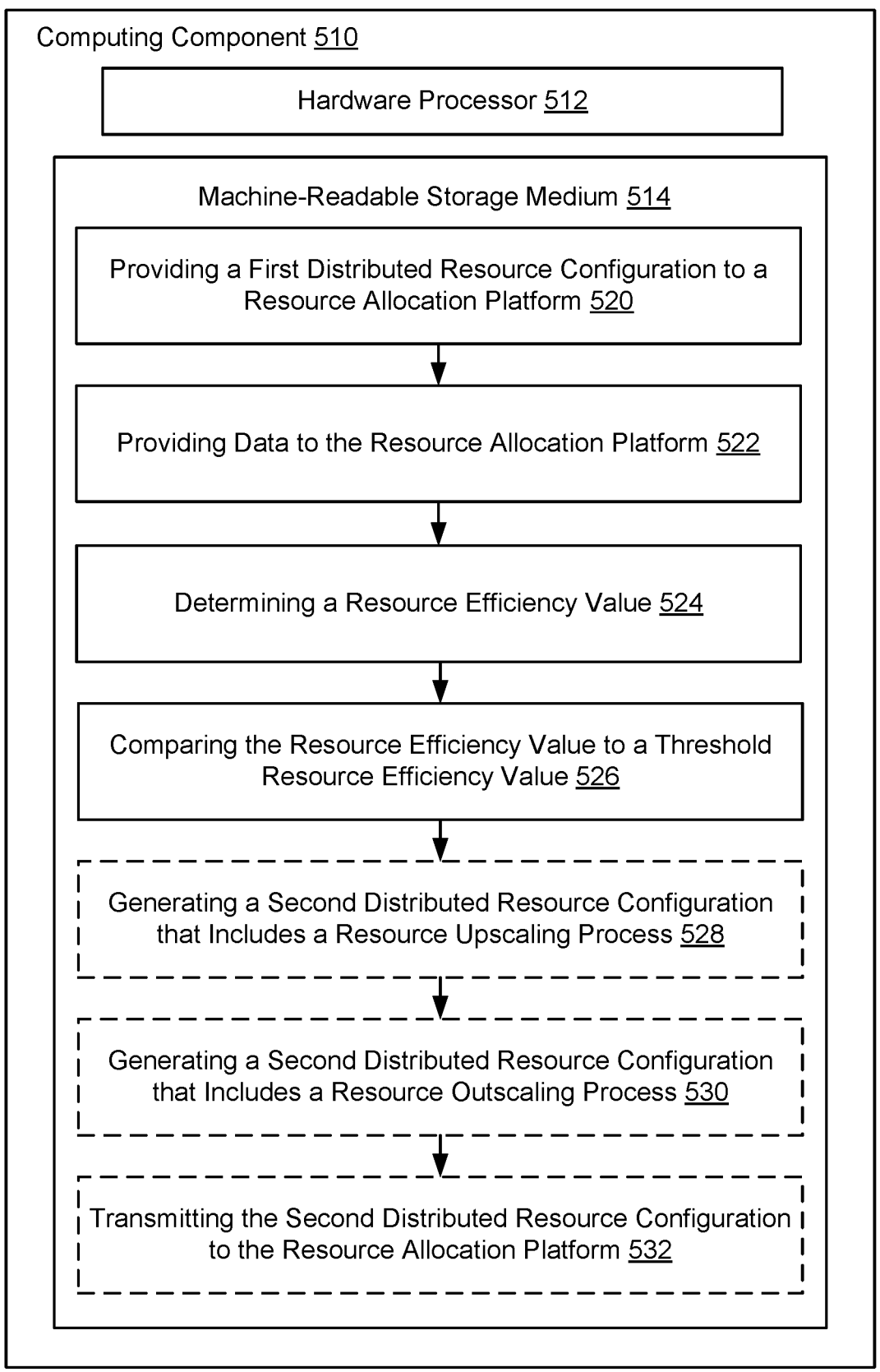
FIG. 5 is an example computing component that may be used to implement various features of embodiments described in the disclosure.

FIG. 5 illustrates an example computing component that may be used to implement network-aware resource allocation in accordance with various embodiments. Computing component 510 may be, for example, a server computer, a controller, or any other similar computing component capable of processing data (e.g., resource usage data, etc.). In the example implementation of FIG. 5, computing component 510 includes hardware processor 512, and machine-readable storage medium for 514.

Hardware processor 512 may be one or more central processing units (CPUs), semiconductor-based microprocessors, and/or other hardware devices suitable for retrieval and execution of instructions stored in machine-readable storage medium 514. Hardware processor 512 may fetch, decode, and execute instructions, such as instructions 520-532, to control processes or operations for network-aware resource allocation. As an alternative or in addition to retrieving and executing instructions, hardware processor 512 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 514, may be any electronic, magnetic, optical, or other physical storage device that contains or stores executable instructions. Thus, machine-readable storage medium 514 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 514 may be a non-transitory storage medium, where the term "non-transitory" does not encompass transitory propagating signals. As described in detail below, machine-readable storage medium 514 may be encoded with executable instructions, for example, instructions 520-532.

Hardware processor 512 may execute instruction 520 to provide a first distributed resource configuration to a resource allocation platform of a distributed network. The resource allocation platform may allocate a plurality of resource containers in the distributed network in accordance with the first distributed resource configuration. In some examples, the allocation may involve virtual machines (VMs) rather than resource containers.

Hardware processor 512 may execute instruction 522 to provide resource usage data to the resource allocation platform. The resource allocation platform may initiate processing of the resource usage data in accordance with the first distributed resource configuration and a processing workload value.

Hardware processor 512 may execute instruction 524 to determine a resource efficiency value of the plurality of resource containers in the distributed network. In some examples, upon determining that the processing workload value exceeds a stabilization threshold of the distributed network, the resource efficiency value may be determined.

Hardware processor 512 may execute instruction 526 to compare the resource efficiency value to a threshold resource efficiency value.

Hardware processor 512 may execute instruction 528 to generate a second distributed resource configuration that includes a resource upscaling process. In some examples, the second distributed resource configuration may be generated with the resource upscaling process when the resource efficiency value is greater than or equal to the threshold resource efficiency value.

In some examples, hardware processor 512 may execute instruction 528 to update the distributed resource configuration rather than generating a second configuration. The updated configuration can include the resource upscaling process.

Hardware processor 512 may execute instruction 530 to generate a second distributed resource configuration that includes a resource outscaling process. In some examples, the second distributed resource configuration may be generated with the resource outscaling process when the resource efficiency value is less than the threshold resource efficiency value.

In some examples, hardware processor 512 may execute instruction 530 to update the distributed resource configuration rather than generating a second configuration. The updated configuration can include the resource outscaling process.

Hardware processor 512 may execute instruction 532 to transmit the second distributed resource configuration (or the updated configuration) to the resource allocation platform of the distributed network. The resource allocation platform may update allocation of the plurality of resource containers in the distributed network in accordance with the second distributed resource configuration.

In some examples, hardware processor 512 may execute an instruction to convert the first distributed resource configuration to a weighted graph and determine a placement of a compute node and/or a resource adjustment. The weighted graph may comprise a first number of parameter server nodes and a first number of worker nodes. The determination of the placement or the resource adjustment may be based on using the weighted graph.

In some examples, the stabilization threshold comprises telemetry information including compute utilization or network utilization associated with the processing of the resource usage data.

In some examples, the first distributed resource configuration identifies the plurality of resource containers in the distributed network as comprising a first number of parameter server nodes and a first number of worker nodes.

In some examples, the second distributed resource configuration changes the plurality of resource containers to include a second number of parameter server nodes or a second number of worker nodes.

In some examples, the resource outscaling process adds one or more parameter server nodes to alleviate a network bandwidth issue.

In some examples, the resource outscaling process adds one or more worker nodes to alleviate a parallelism performance bottleneck or other parallelism issue.

In some examples, the resource upscaling process adds one or more parameter server nodes or worker nodes up to a maximum resource value.

In some examples, the plurality of resource containers in the distributed network is limited to a maximum resource value that is predetermined.

In some examples, the stabilization threshold is a processing workload of compute resource usage and training speed for a predetermined interval of time.

Figure 6:
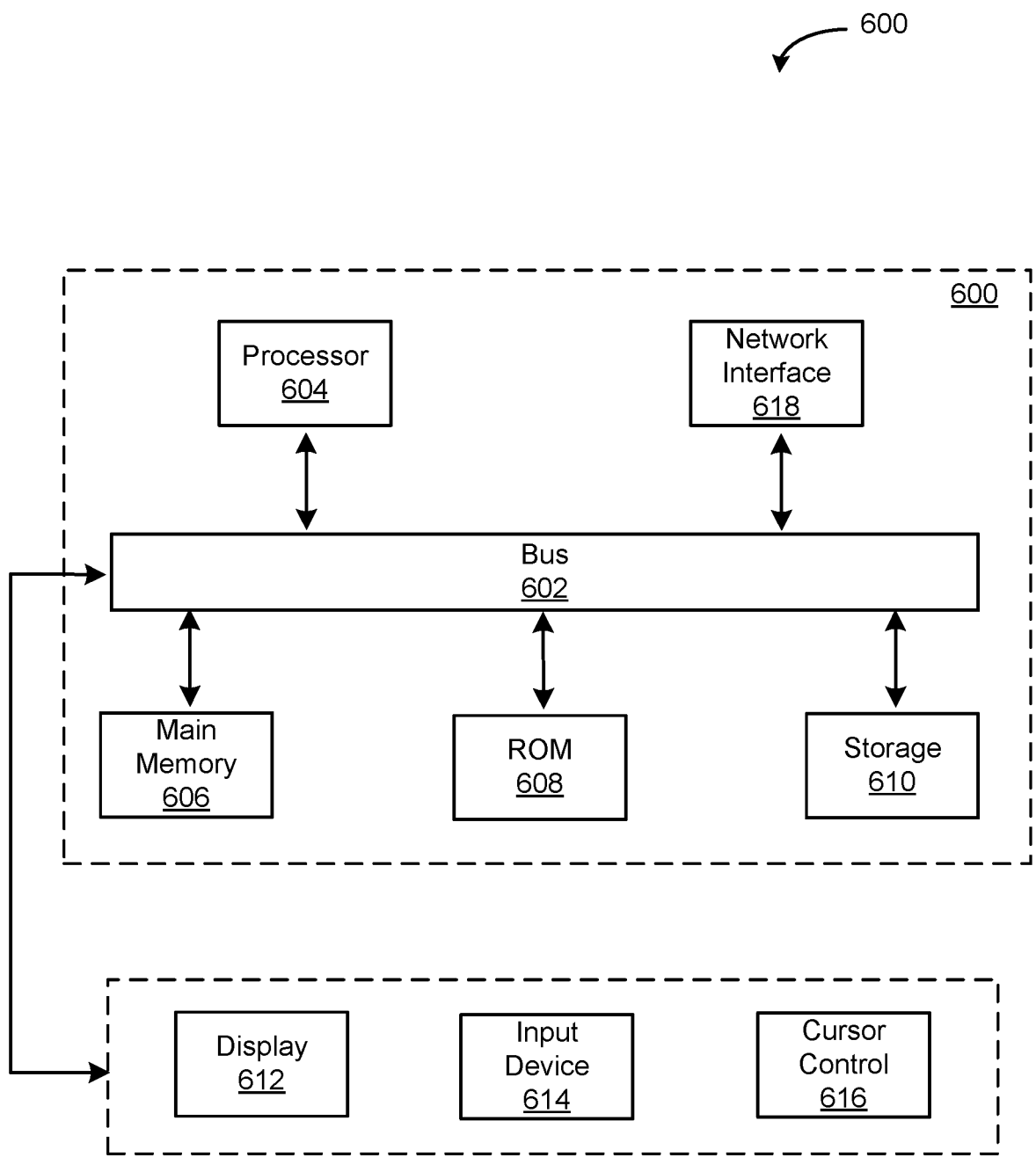
FIG. 6 depicts a block diagram of an example computer system in which various of the embodiments described herein may be implemented.

FIG. 6 depicts a block diagram of an example computer system 600 in which various of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a liquid crystal display (LCD) (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computing device comprising:
    a memory; and
    one or more processors that are configured to execute machine readable instructions stored in the memory that operate the one or more processors to:
        determine a resource efficiency value of a plurality of resource containers in a distributed network;
        compare the resource efficiency value to a threshold resource efficiency value;
        when the resource efficiency value is greater than or equal to the threshold resource efficiency value, generate a distributed resource configuration that includes a resource upscaling process;
        when the resource efficiency value is less than the threshold resource efficiency value, generate the distributed resource configuration that includes a resource outscaling process;
        transmit the distributed resource configuration to a resource allocation platform of the distributed network, wherein the resource allocation platform updates allocation of the plurality of resource containers in the distributed network in accordance with the distributed resource configuration;
        convert the distributed resource configuration to a weighted graph, wherein the weighted graph comprises a first number of parameter server nodes and a first number of worker nodes; and
        using the weighted graph, determine a placement of a compute node or a resource adjustment at node-level or component-level.

2. The computing device of claim 1, wherein a processing workload value associated with a first distributed resource configuration is compared to a stabilization threshold of the distributed network, and wherein the stabilization threshold comprises telemetry information including compute utilization or network utilization associated with processing of resource usage data.

3. The computing device of claim 1, wherein the distributed resource configuration identifies the plurality of resource containers in the distributed network as comprising a first number of parameter server nodes and a first number of worker nodes.

4. The computing device of claim 3, wherein the distributed resource configuration changes the plurality of resource containers to include a second number of parameter server nodes or a second number of worker nodes.

5. The computing device of claim 3, wherein the resource outscaling process adds one or more parameter server nodes to alleviate a network bandwidth issue.

6. The computing device of claim 3, wherein the resource outscaling process adds one or more worker nodes to alleviate a parallelism performance bottleneck.

7. The computing device of claim 3, wherein the resource upscaling process adds one or more parameter server nodes or worker nodes up to a maximum number of resources that can be used for a data processing job.

8. The computing device of claim 1, wherein the plurality of resource containers in the distributed network is limited to a maximum number of resources that can be used for a data processing job that is predetermined.

9. A computing device comprising:
    a memory; and
    one or more processors that are configured to execute machine readable instructions stored in the memory that operate the one or more processors to:
        determine a resource efficiency value of a plurality of resource containers in a distributed network;
        compare the resource efficiency value to a threshold resource efficiency value;
        when the resource efficiency value is greater than or equal to the threshold resource efficiency value, generate a distributed resource configuration that includes a resource upscaling process;
        when the resource efficiency value is less than the threshold resource efficiency value, generate the distributed resource configuration that includes a resource outscaling process;
        transmit the distributed resource configuration to a resource allocation platform of the distributed network, wherein the resource allocation platform updates allocation of the plurality of resource containers in the distributed network in accordance with the distributed resource configuration, wherein a processing workload value associated with a first distributed resource configuration is compared to a stabilization threshold of the distributed network, and wherein the stabilization threshold is a processing workload of compute resource usage and training speed for a predetermined interval of time.

10. The computing device of claim 9, wherein the distributed resource configuration identifies the plurality of resource containers in the distributed network as comprising a first number of parameter server nodes and a first number of worker nodes.

11. The computing device of claim 10, wherein the distributed resource configuration changes the plurality of resource containers to include a second number of parameter server nodes or a second number of worker nodes.

12. The computing device of claim 10, wherein the resource outscaling process adds one or more parameter server nodes to alleviate a network bandwidth issue.

13. The computing device of claim 10, wherein the resource outscaling process adds one or more worker nodes to alleviate a parallelism performance bottleneck.

14. A computer-implemented method comprising:
determining a resource efficiency value of a first plurality of resource containers in a distributed network;
comparing the resource efficiency value to a threshold resource efficiency value;
based on the comparison, updating a first distributed resource configuration to a second distributed resource configuration; and
allocating a second plurality of resource containers in the distributed network in accordance with the second distributed resource configuration that includes a resource upscaling process or a resource outscaling process;
converting the first distributed resource configuration to a weighted graph, wherein the weighted graph comprises a first number of parameter server nodes and a first number of worker nodes; and
using the weighted graph, determining a placement of a compute node or a resource adjustment at a node-level or component-level.

15. The computer-implemented method of claim 14, wherein a processing workload value associated with the first distributed resource configuration is compared to a stabilization threshold of the distributed network, and wherein the stabilization threshold comprises telemetry information including compute utilization or network utilization associated with processing of resource usage data.

16. The computer-implemented method of claim 14, wherein the first distributed resource configuration identifies the first plurality of resource containers in the distributed network as comprising a first number of parameter server nodes and a first number of worker nodes.

17. The computer-implemented method of claim 16, wherein the second distributed resource configuration changes the first plurality of resource containers to include a second number of parameter server nodes or a second number of worker nodes.

18. The computer-implemented method of claim 16, further comprising:
generating the second distributed resource configuration that includes the resource outscaling process, wherein the resource outscaling process adds one or more parameter server nodes to alleviate a network bandwidth issue, and the resource efficiency value being less than the threshold resource efficiency value.

19. The computer-implemented method of claim 16, further comprising:
updating the second distributed resource configuration to include the resource upscaling process, wherein the resource outscaling process adds one or more worker nodes to alleviate a parallelism performance bottleneck, and the resource efficiency value being greater than or equal to the threshold resource efficiency value.

20. The computer-implemented method of claim 16, further comprising:
generating the second distributed resource configuration to include the resource upscaling process, wherein the resource upscaling process adds one or more parameter server nodes or worker nodes up to a maximum number of resources that can be used for a data processing job, and the resource efficiency value being greater than or equal to the threshold resource efficiency value.

21. The computer-implemented method of claim 14, wherein the first plurality of resource containers in the distributed network is limited to a maximum number of resources that can be used for a data processing job that is predetermined.

22. A computer-implemented method comprising:
determining a resource efficiency value of a first plurality of resource containers in a distributed network;
comparing the resource efficiency value to a threshold resource efficiency value; based on the comparison, updating a first distributed resource configuration to a second distributed resource configuration; and
allocating a second plurality of resource containers in the distributed network in accordance with the second distributed resource configuration that includes a resource upscaling process or a resource outscaling process,
wherein a processing workload value associated with the first distributed resource configuration is compared to a stabilization threshold of the distributed network, and
wherein the stabilization threshold is a processing workload of compute resource usage and training speed for a predetermined interval of time.

23. The computer-implemented method of claim 22, wherein the first distributed resource configuration identifies the plurality of resource containers in the distributed network as comprising a first number of parameter server nodes and a first number of worker nodes.

24. The computer-implemented method of claim 23, wherein the second distributed resource configuration changes the plurality of resource containers to include a second number of parameter server nodes or a second number of worker nodes.

25. The computer-implemented method of claim 23, wherein the resource outscaling process adds one or more parameter server nodes to alleviate a network bandwidth issue.

26. The computer-implemented method of claim 23, wherein the resource outscaling process adds one or more worker nodes to alleviate a parallelism performance bottleneck.

* * * * *